US012595827B2

(12) United States Patent　　　(10) Patent No.:　US 12,595,827 B2

Inoue　　　　　　　　　　　　　　(45) Date of Patent:　　Apr. 7, 2026

(54) CLUTCH SYSTEM

(71) Applicant: ISUZU MOTORS LIMITED,
Yokohama (JP)

(72) Inventor: Taiji Inoue, Fujisawa (JP)

(73) Assignee: ISUZU MOTORS LIMITED,
Yokohama (JP)

(*) Notice: Subject to any disclaimer, the term of this
patent is extended or adjusted under 35
U.S.C. 154(b) by 0 days.

(21) Appl. No.: 19/276,046

(22) Filed: Jul. 22, 2025

(65) Prior Publication Data

US 2026/0043442 A1　　Feb. 12, 2026

(30) Foreign Application Priority Data

Aug. 7, 2024　(JP) ................................. 2024-130624

(51) Int. Cl.
*F16D 48/02*　　　(2006.01)
*B60K 23/02*　　　(2006.01)

(52) U.S. Cl.
CPC .............. *F16D 48/02* (2013.01); *B60K 23/02*
(2013.01); *F16D 2048/0266* (2013.01)

(58) Field of Classification Search
CPC .. F16D 48/02; F16D 2048/0266; B60K 23/02
See application file for complete search history.

(56) References Cited

U.S. PATENT DOCUMENTS 6,581,488 B2　6/2003　Miyazaki et al.
2010/0094517 A1*　4/2010　Takei ................... F16D 48/066
192/85.01

2018/0355929 A1　12/2018　Nozu et al.
2019/0039455 A1　2/2019　Nozu et al.
2021/0162859 A1　6/2021　Oda et al.
2023/0182715 A1　6/2023　Bichkar et al.

FOREIGN PATENT DOCUMENTS

DE　　　601 26 384 T2　10/2007
DE　10 2018 113 752 A1　12/2018
DE　10 2018 118 914 A1　2/2019
DE　10 2020 131 456 A1　6/2021
DE　10 2022 132 394 A1　6/2023
JP　　　2000192993 A　*　7/2000
JP　　　2010-241244 A　10/2010

* cited by examiner

*Primary Examiner* — Lori Wu

(74) *Attorney, Agent, or Firm* — Shih IP Law Group,
PLLC

(57)　　　　　ABSTRACT

A clutch system includes a clutch in which a clutch disc and
a flywheel come into contact with each other, a control valve
that supplies hydraulic oil to the clutch, and a supply control
part that supplies electricity from a power source to the
control valve. The supply control part supplies current at a
first current value A1 to the control valve, then sets a current
value of the current to a second current value A2 that is
smaller than the first current value A1, and after setting the
current value to the second current value A2, decreases the
current value over time so that the current value reaches a
third current value A3 that is smaller than the second current
value A2 at a timing when the disengaged clutch is brought
into an engaged state.

10 Claims, 5 Drawing Sheets

CLUTCH SYSTEM

CROSS-REFERENCE TO RELATED APPLICATIONS

The present application claims priority to Japanese Patent Application No. 2024-130624, filed on Aug. 7, 2024, contents of which are incorporated herein by reference in their entirety.

BACKGROUND OF THE INVENTION

The present disclosure relates to a clutch system for connecting or disconnecting power transmission. A clutch for connecting or disconnecting power transmission is known. Japanese Unexamined Patent Application Publication No. 2010-241244 discloses a technique for bringing a hydraulically operated clutch from a disengaged state to an engaged state by supplying hydraulic oil to the clutch.

A clutch disc of a hydraulically operated clutch moves at a speed corresponding to the hydraulic pressure of hydraulic oil supplied to the clutch. Therefore, if the hydraulic pressure of the hydraulic oil supplied to the clutch is high when the clutch disc, which is connected to an input shaft, is brought into contact with a plate of the flywheel, the clutch disc contacts the plate at a higher speed, and thus a shock generated when the clutch disc contacts the plate becomes significant. On the other hand, when the hydraulic pressure of the hydraulic oil supplied to the clutch is low, the moving speed of the clutch disc decreases, and thus the time until the clutch disc comes into contact with the plate of the flywheel becomes longer.

BRIEF SUMMARY OF THE INVENTION

The present disclosure focuses on this point, and an object thereof is to appropriately bring a clutch from a disengaged state into an engaged state.

An aspect of the present disclosure provides a clutch system that includes a clutch that i) includes a clutch disc that is movable in a rotation axis direction of a flywheel connected to a power unit, and ii) is brought into an engaged state, in which the clutch disc and the flywheel come into contact with each other, as the clutch disc, when supplied with hydraulic oil, moves toward the flywheel at a speed corresponding to an amount of the hydraulic oil, a control valve that supplies to the clutch an amount of the hydraulic oil corresponding to a current value of current supplied from a power source, and a supply control part, when transitioning the clutch from a disengaged state, in which the clutch disc and the flywheel are not in contact with each other, to the engaged state, that i) supplies the current at a first current value to the control valve, ii) sets the current value of the current supplied to the control valve to a second current that is value smaller than the first current value, after supplying the current at the first current value to the control valve, and iii) after setting the current value of the current to the second current value, decreases the current value of the current over time so that the current value of the current reaches a third current value smaller than the second current value at a timing when the clutch in the disengaged state is brought into the engaged state.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration of Clutch System S]

Figure 1:
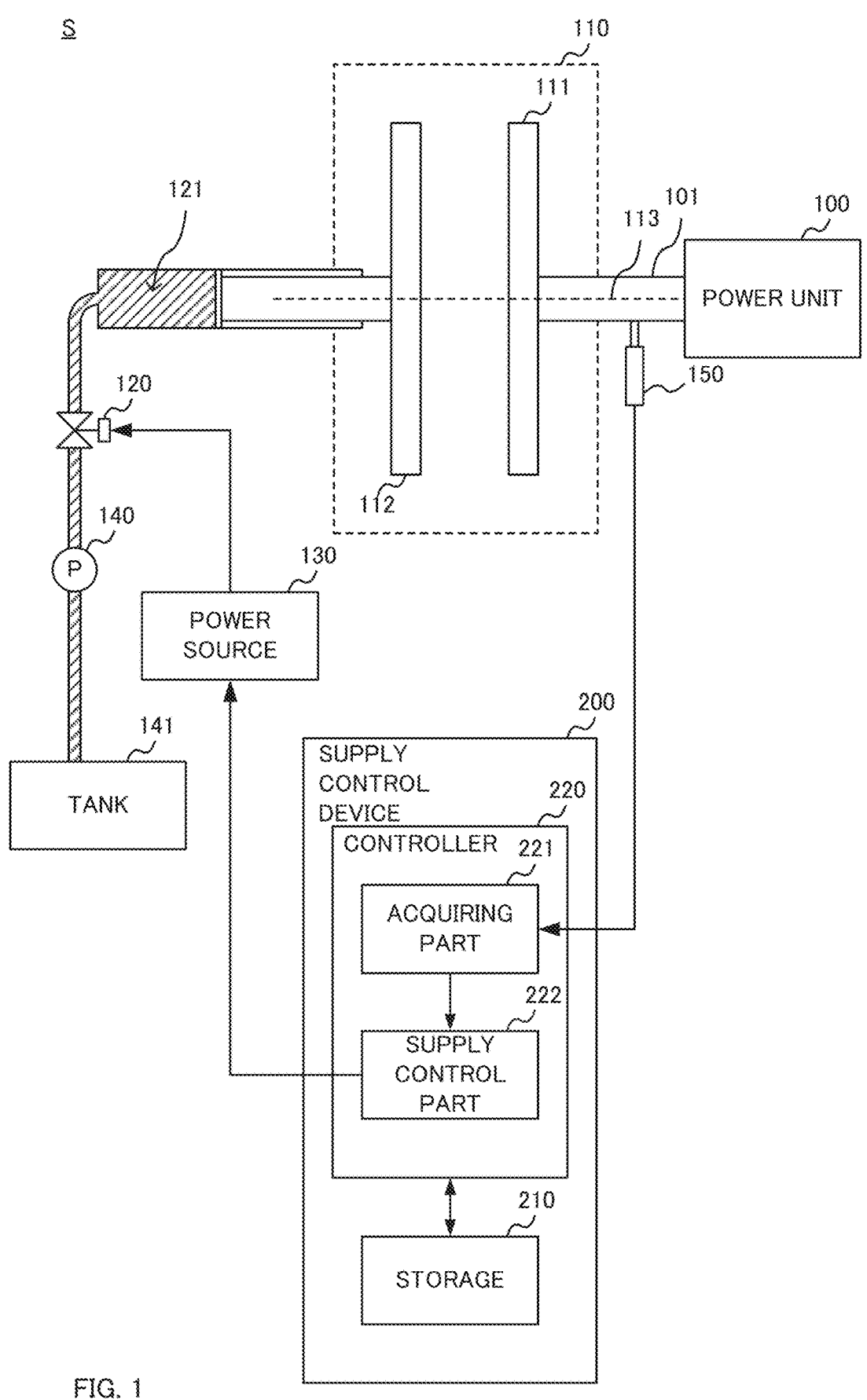
FIG. 1 illustrates a configuration of a clutch system.

FIG. 1 illustrates a configuration of a clutch system S. The clutch system S is a system that connects or disconnects power transmission between a power unit 100 and a power transmission member. The clutch system S is mounted on a vehicle, for example. The clutch system S includes the power unit 100, a clutch 110, a control valve 120, a power source 130, a pump 140, a sensor 150, and a supply control device 200.

The power unit 100 supplies power to the vehicle equipped with the clutch system S. The power unit 100 is an engine, for example, but may be a motor.

The clutch 110 connects or disconnects transmission of power between a power transmission member (not shown in figures) and the power unit 100. The power transmission member is a transmission mechanism, for example. The transmission mechanism transmits power from the power unit 100 to the wheels of the vehicle while changing the torque and rotational speed. The clutch 110 includes a flywheel 111 and a clutch disc 112. As shown in FIG. 1, a state in which the flywheel 111 and the clutch disc 112 are not in contact is defined as a disengaged state of the clutch 110.

The flywheel 111 is coupled to an output shaft 101 of the power unit 100. The flywheel 111 rotates in conjunction with the rotation of the output shaft 101 of the power unit 100.

Figure 2:
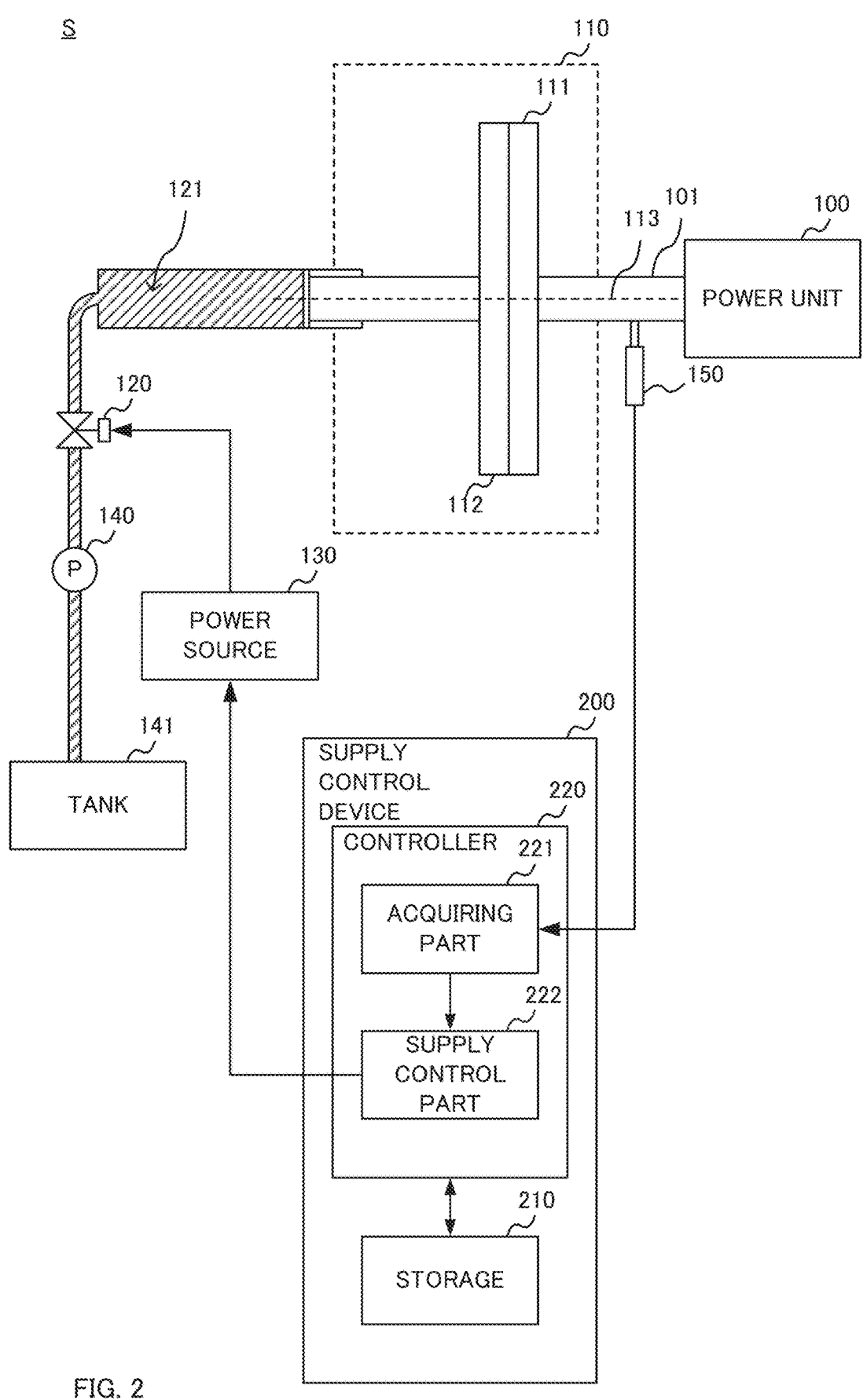
FIG. 2 is a schematic view of a clutch in an engaged state.

The clutch disc 112 is in contact with the flywheel 111 to transmit power from the power unit 100 to the power transmission member. When supplied with hydraulic oil 121, the clutch disc 112 moves toward the flywheel 111 in the rotation axis direction of the flywheel 111. The rotation axis direction is parallel to an axial direction 113 of the output shaft 101. The clutch disc 112 comes into contact with the flywheel 111 by moving toward the flywheel 111 in the axial direction 113. A state in which the clutch disc 112 and the flywheel 111 are in contact is defined as an engaged state of the clutch 110. FIG. 2 is a schematic view of the clutch 110 in the engaged state. In the engaged state of the clutch 110, the clutch disc 112 in contact with the flywheel 111 is rotated together with the flywheel 111, thereby transmitting power from the power unit 100 to the power transmission member.

The control valve 120 adjusts the amount of the hydraulic oil 121 to be supplied to the clutch 110. The control valve 120 supplies the hydraulic oil 121 to the clutch disc 112 of the clutch 110 in an amount corresponding to a current value of current supplied from the power source 130. When supplied with the hydraulic oil 121, the clutch disc 112 moves at a speed corresponding to the amount of the hydraulic oil 121. Specifically, the clutch disc 112 receives a pressure corresponding to the amount of the supplied hydraulic oil 121, and moves toward the flywheel 111 in the axial direction 113 at a speed corresponding to the received pressure. More specifically, the clutch disc 112 receives a larger pressure as the amount of the supplied hydraulic oil 121 increases, and so the clutch disc 112 moves faster as the amount of the supplied hydraulic oil 121 increases.

The power source 130 supplies current to the control valve 120. The power source 130 is at least one of a generator that generates electric power using power from the power unit 100, or a battery, but may be both, and is not limited thereto.

The pump 140 supplies the hydraulic oil 121 accommodated in a tank 141 to the control valve 120. The pump 140 is any of a centrifugal pump, an axial flow pump, or a gear pump, for example. The pump 140 is driven by power from the power unit 100, for example, but may be driven by power from the power source 130. The pump 140 may be any pump that can supply the hydraulic oil 121 to the control valve 120.

The sensor 150 detects the rotational speed of the flywheel 111. The sensor 150 detects, as the rotational speed of the flywheel 111, the rotational speed of the output shaft 101 connecting the flywheel 111 and the power unit 100, for example. A known sensor capable of detecting the rotational speed of the output shaft 101 can be used as the sensor 150. The sensor 150 detects the rotational speed of the flywheel 111 at predetermined intervals. The predetermined interval is 10 milliseconds, for example, but is not limited thereto.

The supply control device 200 includes a storage 210 and a controller 220. The storage 210 is a storage medium including a Read Only Memory (ROM), a Random Access Memory (RAM), a hard disk, and the like. The storage 210 stores a program executed by the controller 220.

The controller 220 is a calculation resource including a processor such as a Central Processing Unit (CPU). The controller 220 implements functions of an acquisition part 221 and a supply control part 222 by executing the program stored in the storage 210.

The acquisition part 221 acquires the rotational speed of the flywheel 111 detected by the sensor 150. The acquisition part 221 acquires a first rotational speed of the flywheel 111 when the clutch 110 is in the disengaged state. In other words, the acquisition part 221 acquires, as the first rotational speed in the disengaged state, the rotational speed detected when power from the power unit 100 is not transmitted to the power transmission member. In addition, the acquisition part 221 acquires a second rotational speed of the flywheel 111 after the clutch 110 is brought into the engaged state. In other words, the acquisition part 221 acquires, as the second rotational speed after the clutch 110 is brought into the engaged state, the rotational speed detected when power from the power unit 100 is transmitted to the power transmission member.

The supply control part 222 causes the power source 130 to supply current to the control valve 120. When the supply control part 222 causes the power source 130 to supply current to the control valve 120, the hydraulic oil 121 is supplied to the clutch disc 112. When the hydraulic oil 121 is supplied to the clutch disc 112, the clutch disc 112 moves toward the flywheel 111. Subsequently, when the clutch disc 112 comes into contact with the flywheel 111, the clutch 110 in the disengaged state is brought into the engaged state.

The clutch disc 112 moves at a speed corresponding to the amount of the hydraulic oil 121 supplied to the clutch disc 112. As the amount of the hydraulic oil 121 supplied to the clutch disc 112 increases, the hydraulic pressure applied to the clutch disc 112 also increases. When the hydraulic pressure applied to the clutch disc 112 is high, the moving speed of the clutch disc 112 increases, and the clutch disc 112 contacts the flywheel 111 at a high speed. In this case, the shock generated when the clutch disc 112 comes into contact with the flywheel 111 becomes greater. On the other hand, as the amount of the hydraulic oil 121 supplied to the clutch disc 112 decreases, the hydraulic pressure applied to the clutch disc 112 also decreases. When the hydraulic pressure applied to the clutch disc 112 is low, the moving speed of the clutch disc 112 is reduced, and thus the shock generated upon contact with the flywheel 111 is reduced, but the time required for the clutch disc 112 to contact the flywheel 111 becomes longer.

Therefore, the supply control part 222 controls the current value of the current output from the power source 130 so that the clutch 110 in the disengaged state is appropriately brought into the engaged state. For example, after supplying current having a relatively high current value to the control valve 120, the supply control part 222 gradually decreases the current value of the current so that the clutch disc 112 reaches an appropriate speed for contact with the flywheel 111. Accordingly, the supply control part 222 can reduce the shock at the time of contact and shorten the time required to bring the clutch 110 from the disengaged state to the engaged state. A process for bringing the clutch 110 from the disengaged state into the engaged state will be described below. In the following description, a process for bringing the clutch 110 from the disengaged state to the engaged state is referred to as an engagement process.

Figure 3:
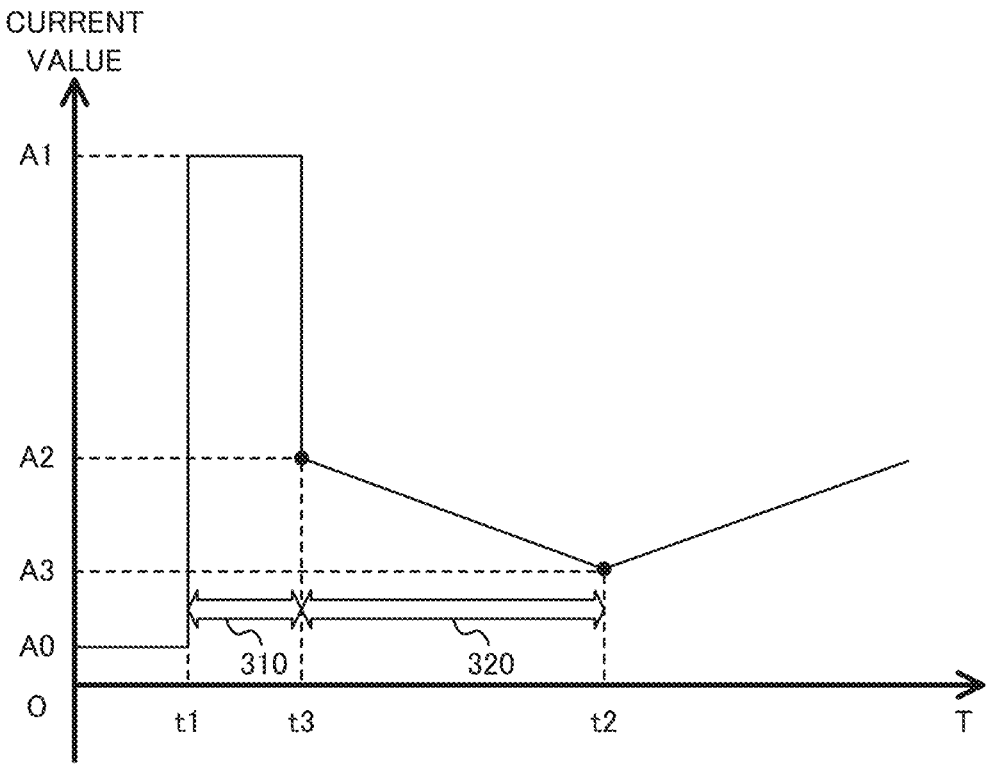
FIG. 3 illustrates an engagement process.

FIG. 3 illustrates the engagement process. In FIG. 3, the horizontal axis represents time T, and the vertical axis represents the current value [mA] of the current supplied from the power source 130 to the control valve 120. The engagement process is started when the supply control part 222 receives an engagement instruction to bring the clutch 110 from the disengaged state into the engaged state. The engagement instruction is output from a control device that controls traveling of a vehicle, for example. One example of the control device is a transmission control device that controls the gear position of the vehicle by controlling the transmission mechanism, but is not limited thereto.

The supply control part 222 sets the current value of the current supplied from the power source 130 to the control valve 120 to a standby current value A0 until the engagement instruction is received. The standby current value A0 is 10 mA, for example, but is not limited thereto. While current at the standby current value A0 is supplied, the control valve 120 sets the amount of the hydraulic oil 121 supplied to the clutch 110 to zero.

When the engagement instruction is received, the supply control part 222 sets the current value of the current supplied from the power source 130 to the control valve 120 to a first current value A1. A first time point t1 is a time at which the supply control part 222 sets the current value of the current to the first current value A1 and starts supplying the current at the first current value A1 to the control valve 120. The first current value A1 is greater than the standby current value A0. The current value of the first current value A1 is determined by the specification of the control valve 120 or by experiment. A specific value of the first current value A1 is 800 mA, for example, but is not limited thereto. The supply control part 222 continues to maintain the current value of the current supplied from the power source 130 to the control valve 120 at the first current value A1 until a first period 310 has elapsed from the first time point t1. When the current at the first current value A1 is supplied, the control valve 120 supplies the amount of the hydraulic oil 121 corresponding to the first current value A1 to the clutch 110.

The supply control part 222 causes the power source 130 to supply the current at the first current value A1 to the control valve 120, and then sets the current value of the current to a second current value A2. The second current value A2 is smaller than the first current value A1. For example, the second current value A2 is equal to or less than half of the first current value A1. A specific value of the second current value A2 is 300 mA, for example, but is not limited thereto. When the current at the second current value A2 is supplied, the control valve 120 supplies the amount of the hydraulic oil 121 corresponding to the second current value A2 to the clutch 110. The supply control part 222 sets the current value of the current to the second current value A2 at a third time point t3, which is a time point when the first period 310 has elapsed from the first time point t1. The first period 310 is predetermined by experiments or the like, and is 60 milliseconds, for example, but is not limited thereto. The third time point t3 is a time at which the supply control part 222 sets the current value of the current to the second current value A2 and starts supplying current at the second current value A2 to the control valve 120.

After setting the current value of the current to the second current value A2, the supply control part 222 sets the current value of the current to a third current value A3. The third current value A3 is smaller than the second current value A2. Specifically, after setting the current value of the current to the second current value A2, the supply control part 222 decreases the current value of the current to the third current value A3 over time. The control valve 120 decreases the amount of the hydraulic oil 121 supplied to the clutch 110 in accordance with a decrease in the current value of the supplied current.

The third current value A3 is a current value at which the magnitude of the shock generated when the clutch disc 112 contacts the flywheel 111 is equal to or less than a predetermined level. A specific value of the third current value A3 is 90 mA, for example, but is not limited thereto. The magnitude of the shock is defined by a change in the rotational speed of the flywheel 111, for example. Specifically, the magnitude of the shock is defined by the difference between the first rotational speed of the flywheel 111 in the disengaged state and the second rotational speed of the flywheel 111 after the clutch 110 is brought into the engaged state. That is, the third current value A3 is determined by an experiment or the like so that the difference between the first rotational speed and the second rotational speed is equal to or less than the predetermined level.

The supply control part 222 decreases the current value of the current over time so that the current value reaches the third current value A3 at a predetermined timing after the current is set to the second current value A2. The predetermined timing is a reference timing at which the clutch 110 in the disengaged state is brought into the engaged state. Specifically, the reference timing is a second time point t2, which occurs after a period of time has elapsed from the first time point t1 until the clutch disc 112 of the clutch 110 in the disengaged state comes into contact with the flywheel 111. The reference timing in the present embodiment is determined according to the time required for shifting in the vehicle equipped with the clutch system S. In the present embodiment, the time from the first time point t1 to the second time point t2 is 200 milliseconds, but is not limited thereto.

The supply control part 222 decreases the current value of the current over time at a rate based on the difference between the second current value A2 and the third current value A3. Specifically, the supply control part 222 decreases the current value over the second period 320, from the third time point t3 at which the current is set to the second current value A2, to a second time point t2, at a rate corresponding to the difference between the second current value A2 and the third current value A3 divided by the second period 320. The supply control part 222 determines the rate using the following equation (1).

$$\text{rate} = (\text{second current value } A2 - \text{third current value } A3)/(\text{second period } 320) \tag{1}$$

The rate of the present embodiment is (300–90) [mA]/(140) [msec], and 1.5 [mA/msec], but is not limited thereto.

In this way, the supply control part 222 can supply greater amount of the hydraulic oil 121 to the control valve 120, compared to the case in which the third current value A3 is continuously supplied from the power source 130 to the control valve 120 from the third time point t3 to the second time point t2. As a result, the moving speed of the clutch disc 112 increases, and so the supply control part 222 can shorten the time required for the clutch disc 112 to come into contact with the flywheel 111.

Further, if the current value is set to the third current value A3 when the second time point t2 is approaching, there is a risk that the deceleration of the clutch disc 112 will not be completed in time, and the clutch disc 112 may contact the flywheel 111 at a high speed. In contrast, the supply control part 222 decreases the current value over time, thereby reducing the moving speed of the clutch disc 112 as time elapses. As a result, the supply control part 222 can reduce the speed at which the clutch disc 112 comes into contact with the flywheel 111 and thus suppress the generation of shock.

When the clutch 110 is in the disengaged state, the clutch disc 112 rotates at the same rotational speed as the wheels connected to the clutch disc 112 via the transmission. On the other hand, the flywheel 111, when the clutch 110 is in the disengaged state, rotates at the same rotational speed as the power unit 100. When the clutch disc 112 comes into contact with the flywheel 111 while the rotational speeds of the clutch disc 112 and the flywheel 111 are different, a contact shock occurs due to a change in the rotational speed of the flywheel 111. Therefore, the clutch disc 112 and the flywheel 111 are synchronously controlled so that their rotational speeds match when they come into contact. The synchronous control is, for example, control that adjusts the rotational speed of the flywheel 111 to that of the clutch disc 112, on the assumption that the clutch disc 112 comes into contact with the flywheel 111 at the reference timing and is rotating at the same speed as the wheels at the reference timing.

However, the moving speed of the clutch disc 112 varies depending on factors such as changes in the viscosity or volume of the hydraulic oil 121 caused by variations in air temperature, manufacturing tolerances of the clutch 110, and the like. Accordingly, the actual timing at which the clutch disc 112 comes into contact with the flywheel 111 may become earlier or later. When the actual timing is earlier or later than the reference timing, the clutch disc 112 comes into contact with the flywheel 111 in a state where the rotational speeds of the flywheel 111 and the clutch disc 112 are not synchronized. As a result, when the clutch disc 112 contacts the flywheel 111, the rotational speed of the flywheel 111 changes, resulting in a contact shock.

Accordingly, when a contact shock occurs, the supply control part 222 changes the actual timing at which the clutch 110 is brought into the engaged state by modifying the second current value A2. For example, if the actual timing is later than the reference timing, the supply control part 222 increases the second current value A2 to cause the actual timing to occur earlier.

Figure 4:
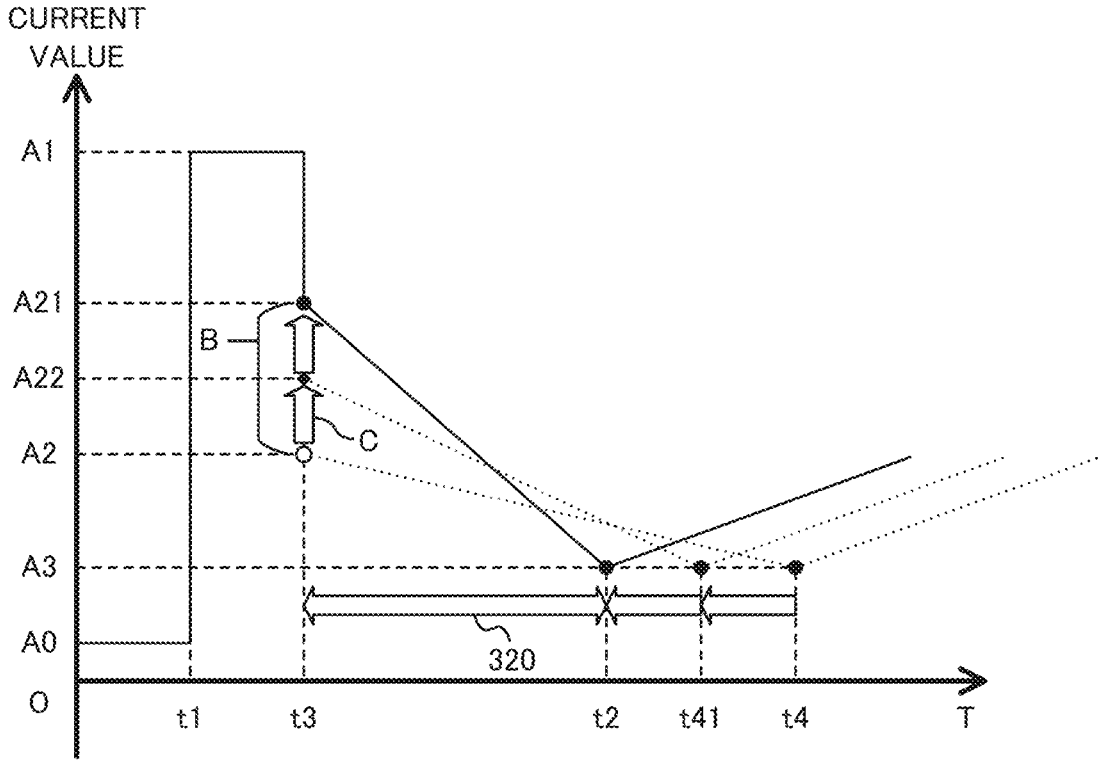
FIG. 4 illustrates a process for causing an actual timing to occur earlier.

The following describes a process for causing the actual timing to occur earlier when the actual timing is later than the reference timing. FIG. 4 illustrates the process for causing the actual timing to occur earlier. The vertical axis and the horizontal axis in FIG. 4 are the same as those in FIG. 3.

First, the supply control part 222 determines whether or not a contact shock has occurred, based on a change in the rotational speed of the flywheel 111 before and after the clutch disc 112 comes into contact with the flywheel 111. Specifically, the supply control part 222 determines that a contact shock has occurred if the difference between the first rotational speed of the flywheel 111 in the clutch 110's disengaged state and the second rotational speed of the flywheel 111 after the clutch 110 transitions to the engaged state is equal to or greater than a predetermined threshold value. The predetermined threshold value is a value for determining that an impact (contact shock) has occurred at the time of contact, and is determined by experiment or the like. If the rotational speed difference is less than the predetermined threshold value, the supply control part 222 determines that a contact shock has not occurred.

Next, the supply control part 222 determines whether the timing at which the contact shock occurred is before or after the reference timing. For example, when the time point at which a rotational speed difference equal to or greater than the predetermined threshold value is detected is later than the second time point t2, the supply control part 222 determines that the contact shock has occurred after the reference timing. As a specific example, when the rotational speed difference equal to or greater than the predetermined threshold value is detected at a fourth time point t4 following the second time point t2, the supply control part 222 determines that the contact shock has occurred after the reference timing.

The supply control part 222 increases the second current value A2 used to transition the clutch 110 from the disengaged state to the engaged state when the contact shock has occurred after the reference timing. For example, the supply control part 222 increases the second current value A2 for the next transition of the clutch 110 from the disengaged state to the engaged state as the rotational speed difference increases. More specifically, the supply control part 222 sets the second current value A2 for the next transition of the clutch 110 from the disengaged state to the engaged state to a corrected second current value A21, which is obtained by adding a modification amount B for the second current value A2, determined according to the rotational speed difference, to the second current value A2. It should be noted that the modification amount B increases as the rotational speed difference increases. The modification amount B is predetermined by experiments or the like, and is stored in the storage 210.

As a result, the amount of the hydraulic oil 121 supplied during a time from the third time point t3 to the second time point t2 increases, thereby increasing the moving speed of the clutch disc 112. Consequently, the time required for the clutch disc 112 to come into contact with the flywheel 111 is reduced, causing the actual timing to advance. In other words, the supply control part 222 can cause the actual timing that had been delayed to occur earlier, thereby aligning the actual timing at which the clutch 110 is brought into the engaged state with the reference timing.

As described above, the supply control part 222 increases the second current value A2 as the rotational speed difference increases. However, if an excessively large modification amount B is added to the second current value A2, the actual timing may occur before the reference timing.

Therefore, if the modification amount B is equal to or larger than a predetermined current value, the supply control part 222 increases the second current value A2 in a plurality of steps. For example, if the modification amount B corresponding to the rotational speed difference is equal to or greater than the predetermined current value, the supply control part 222 increases the second current value by a correction amount C that is smaller than the modification amount B. Specifically, if the modification amount B corresponding to the rotational speed difference is equal to or greater than the predetermined current value, the supply control part 222 modifies the second current value by the correction amount C that is smaller than the modification amount B. More specifically, the supply control part 222 sets the second current value to an intermediate corrected current value A22 obtained by adding the correction amount C to the present second current value A2. The correction amount C is half of the modification amount B, for example, but is not limited thereto. The correction amount C may be a minimum amount of modification applicable to the current, or an integer multiple of the minimum amount.

The supply control part 222 determines whether or not the rotational speed difference is equal to or greater than the predetermined threshold value, after updating the second current value A2 to the intermediate corrected current value A22 by adding the correction amount C to the present second current value A2 and transitioning the clutch 110 from the disengaged state to the engaged state. When the rotational speed difference after the update of the current value is equal to or greater than the predetermined threshold value, the supply control part 222 sets the current value to a corrected second value A21 obtained by adding the correction amount C to the intermediate corrected current value A22.

When the rotational speed difference after updating the second current value A2 to the intermediate corrected current value A22 is less than the predetermined threshold value, the supply control part 222 maintains the second current value A2 at the intermediate corrected current value A22. In this manner, the supply control part 222 can suppress an advance of the actual timing relative to the reference timing by increasing the second current value A2 in a plurality of steps.

Figure 5:
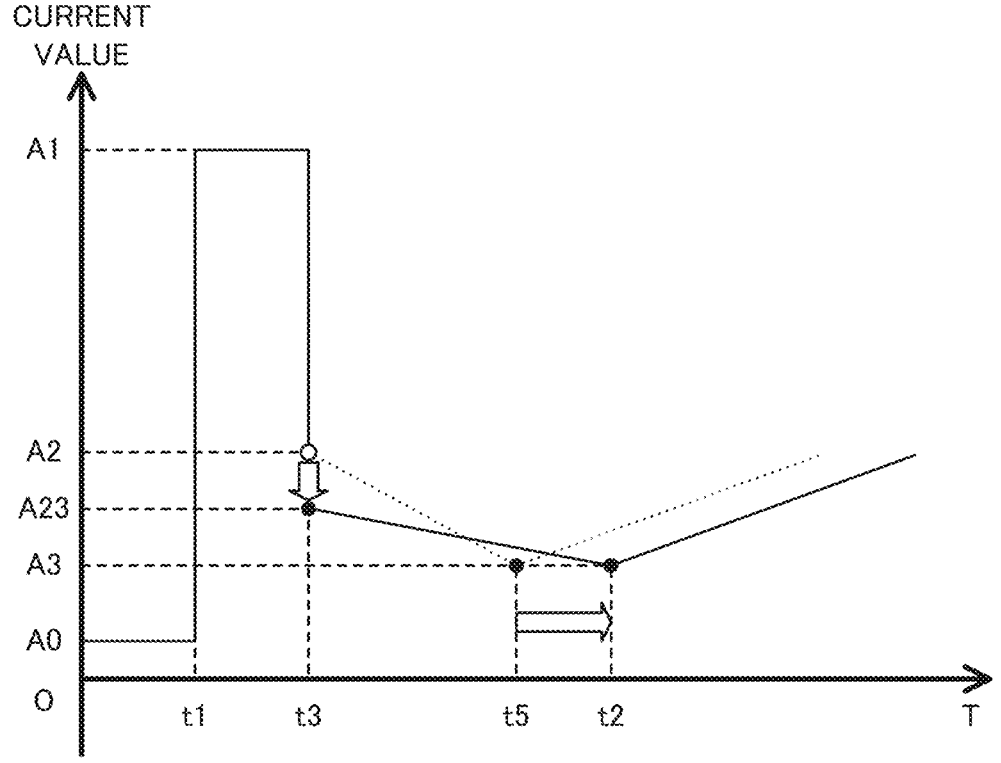
FIG. 5 illustrates a process for causing the actual timing to occur later.

The process for causing the actual timing to occur earlier when it occurs after the reference timing has been described. Next, the process for causing the actual timing to occur later when it occurs earlier than the reference timing will be described. FIG. 5 illustrates the process for causing the actual timing to occur later. The vertical axis and the horizontal axis in FIG. 5 are the same as those in FIG. 3.

The supply control part 222 decreases the second current value A2 used to transition the clutch 110 from the disengaged state to the engaged state when the contact shock has occurred before the reference timing. Specifically, if a fifth time point t5, at which a rotational speed difference equal to or greater than the predetermined threshold value is detected, occurs earlier than the reference timing, the supply control part 222 decreases the second current value A2 for the next transition of the clutch 110 from the disengaged state to the engaged state. More specifically, the supply control part 222 sets the second current value A2 to a corrected second current value A23, obtained by subtracting a modification amount, which corresponds to a difference between the reference timing (second time point t2) and the fifth time point t5, from the present second current value A2.

In this way, the amount of the hydraulic oil 121 supplied between the third time point t3 and the second time point t2 decreases, thereby decreasing the moving speed of the clutch disc 112. Consequently, the time required for the clutch disc 112 to come into contact with the flywheel 111 becomes longer, causing a delay in the actual timing at which the clutch 110 transitions to the engaged state. In other words, the supply control part 222 can cause the actual timing that had been earlier to occur later, thereby aligning the actual timing at which the clutch 110 is brought into the engaged state with the reference timing.

If the modification amount corresponding to the difference between the second time point t2 and the fifth time point t5 is equal to or greater than the predetermined current value, the supply control part 222 may decrease the second current value A2 by a correction amount that is smaller than the modification amount. If the modification amount is equal to or greater than the predetermined current value, the supply control part 222 sets the current value of the current to a corrected second current value obtained by subtracting the correction amount from the present second current value A2. Accordingly, the supply control part 222 can prevent the actual timing at which the clutch disc 112 comes into contact with the flywheel 111 from occurring later than the reference timing.

As described above, when the actual timing does not match the reference timing, the supply control part 222 modifies the second current value A2, thereby aligning the actual timing with the reference timing. However, in an actual vehicle, a contact shock may cease to occur after it has initially occurred, due to aging of the clutch 110, environmental changes, or the like. In other words, even if a rotational speed difference equal to or greater than the predetermined threshold value is detected, the rotational speed difference may fall below the threshold value by the time the clutch 110 in the disengaged state is brought into the engaged state. In such a case, if the supply control part 222 modifies the second current value A2, the actual timing does not match the reference timing.

Therefore, the supply control part 222 modifies the second current value A2 if there is a high probability that the actual timing does not match the reference timing. For example, when a rotational speed difference equal to or greater than the predetermined threshold value is detected at least a predetermined number of times, the supply control part 222 determines that the timings are likely not to match and modifies the second current value A2. Specifically, the supply control part 222 counts the number of times a rotational speed difference equal to or greater than the predetermined threshold value is detected, and determines that the actual timing likely does not match the reference timing when the count reaches or exceeds the predetermined number of times. The supply control part 222 determines that the probability that the actual timing does not match the reference timing is low while the count remains below the predetermined number of times. The predetermined number of times is a value for determining whether to modify the second current value. The predetermined number of times may be appropriately determined by experiments or the like. A specific value of the predetermined number of times is three, for example, but is not limited thereto.

The supply control part 222 counts the number of times based on whether the time point at which a rotational speed difference equal to or greater than the predetermined threshold value is detected is before or after the reference timing. For example, the supply control part 222 obtains a first count corresponding to the number of times the actual timing occurs earlier than the reference timing. Specifically, the supply control part 222 obtains the first count when a rotational speed difference equal to or greater than the predetermined threshold value is detected at a time point before the reference timing. If the first count reaches or exceeds the predetermined number of times, the supply control part 222 decreases the second current value A2.

The supply control part 222 obtains a second count corresponding to the number of times the actual timing occurs later than the reference timing. The supply control part 222 obtains the second count when a rotational speed difference equal to or greater than the predetermined threshold value is detected at a time point after the reference timing. If the second count reaches or exceeds the predetermined number of times, the supply control part 222 increases the second current value A2.

When a rotational speed difference equal to or greater than the predetermined threshold value is detected three times, the supply control part 222 modifies the second current value A2 and resets the number of times to zero. Accordingly, the supply control part 222 can suppress a modification in the second current value A2 when the probability that the actual timing does not match the reference timing is low, and can modify the second current value A2 when the probability is high.

By the way, the actual timing may be earlier or later than the reference timing due to aging of the clutch 110, environmental changes, or the like. Therefore, the actual timing may become earlier than the reference timing after having been later than the reference timing. In this case, merely counting the number of times a rotational speed difference equal to or greater than the predetermined threshold value is detected may result in further advancing the actual timing, even though the actual timing is already earlier than the reference timing.

Accordingly, when the actual timing occurs after the reference timing before the first count reaches or exceeds the predetermined number of times, the supply control part 222 resets the first count to zero and starts obtaining the second count representing the number of times the actual timing occurs after the reference timing. Specifically, when a rotational speed difference equal to or greater than the predetermined threshold value is detected even once after the reference timing, and before the first count reaches or exceeds the predetermined number of times, the supply control part 222 resets the first count to zero and sets the second count to one. Similarly, when a rotational speed difference equal to or greater than the predetermined threshold value is detected before the reference timing, and before the second count reaches or exceeds the predetermined number of times, the supply control part 222 resets the second count to zero and sets the first count to one. In this way, the supply control part 222 can appropriately modify the second current value A2 even when the actual timing becomes earlier or later than the reference timing due to aging of the clutch 110, environmental changes, or the like.

Modified Example 1

When the current value of the current is decreased over time to reach the third current value A3, the supply control part 222 may decrease the current value continuously or in a stepwise manner. In the case of stepwise decrease, the supply control part 222 may decrease the current value of the current at a constant rate per unit time or vary the reduction rate per unit time.

Modified Example 2

In the above embodiment, the clutch 110 is a dry clutch in which the flywheel 111 and the clutch disc 112 come into direct contact with each other. However, the clutch 110 is not limited thereto. For example, the clutch 110 may be a wet multi-plate clutch in which a plurality of separator plates connected to a shaft of the flywheel are engaged with a plurality of friction plates connected to the input shaft. In this case, the plurality of friction plates correspond to the clutch disc 112. The wet multi-plate clutch is brought into the engaged state when the separator plates and the friction plates come into contact with each other.

[Effects of Clutch System S]

As described above, the clutch system S includes the clutch 110 that is brought into the engaged state as the clutch disc 112 moves toward the flywheel 111 at a speed corresponding to the amount of the supplied hydraulic oil 121, the control valve 120 that supplies to the clutch 110 an amount of the hydraulic oil 121 corresponding to the current value of the current supplied from the power source 130, and the supply control part 222 that causes the power source 130 to supply the current to the control valve 120. When transitioning the clutch 110 from the disengaged state, in which the clutch disc 112 and the flywheel 111 are not in contact with each other, to the engaged state, the supply control part 222 i) supplies the current at the first current value A1 to the control valve 120 and then ii) sets the current value of the current supplied to the control valve 120 to the second current value A2 that is smaller than the first current value A1, and iii) after setting the current value of the current to the second current value A2, decreases the current value of the current over time so that the current value of the current reaches the third current value A3 that is smaller than the second current value A2 at the reference timing (the second time point t2) at which the clutch 110 in the disengaged state is brought into the engaged state.

In this way, the clutch system S can cause the clutch disc 112 to contact the flywheel 111 at a speed lower than that in the case where the clutch disc 112 contacts the flywheel 111 while the first current value A1 is supplied to the control valve 120. As a result, the clutch system S can reduce the shock occurring when the clutch 110 is brought into the engaged state. Further, the clutch system S can supply a greater amount of the hydraulic oil 121 to the clutch 110 than in the case where the current value is immediately changed from the first current value A1 to the third current value A3, thereby shortening the time required to bring the clutch 110 from the disengaged state to the engaged state. In this way, the clutch system S can reduce the shock occurring at the time when the clutch 110 in the disengaged state is brought into the engaged state, and shorten the time required to bring the clutch 110 from the disengaged state to the engaged state. That is, the clutch system S can appropriately bring the clutch from the disengaged state into the engaged state.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A clutch system comprising:
   a clutch that i) includes a clutch disc that is movable in a rotation axis direction of a flywheel connected to a power unit, and ii) is brought into an engaged state, in which the clutch disc and the flywheel come into contact with each other, as the clutch disc, when supplied with hydraulic oil, moves toward the flywheel at a speed corresponding to an amount of the hydraulic oil;
   a control valve that supplies to the clutch an amount of the hydraulic oil corresponding to a current value of current supplied from a power source; and
   a supply control part, when transitioning the clutch from a disengaged state, in which the clutch disc and the flywheel are not in contact with each other, to the engaged state, that i) supplies the current at a first current value to the control valve, ii) sets the current value of the current supplied to the control valve to a second current that is value smaller than the first current value, after supplying the current at the first current value to the control valve, and iii) after setting the current value of the current to the second current value, decreases the current value of the current over time so that the current value of the current reaches a third current value smaller than the second current value at a timing when the clutch in the disengaged state is brought into the engaged state.

2. The clutch system according to claim 1, wherein
   the timing is a second time point, which occurs after a period of time has elapsed from a first time point, when supply of the current at the first current value to the control valve is started, until the clutch disc of the clutch in the disengaged state comes into contact with the flywheel.

3. The clutch system according to claim 2, wherein
   the supply control part decreases the current value of the current over a time, from a third time point at which the current value of the current is set to the second current value, to a second time point, at a rate corresponding to a difference between the second current value and the third current value divided by the time.

4. The clutch system according to claim 1, wherein
   the supply control part modifies, when bringing the clutch from the disengaged state to the engaged state, the second current value for the next transition of the clutch from the disengaged state to the engaged state, if a rotational speed difference between a rotational speed of the flywheel in the disengaged state and a rotational speed of the flywheel after the clutch is brought into the engaged state is equal to or greater than a predetermined threshold value for determining that an impact has occurred at the time of contact.

5. The clutch system according to claim 4, wherein
   when the rotational speed difference equal to or greater than the predetermined threshold value is detected, the supply control part increases a modification amount for the second current value as the rotational speed difference increases.

6. The clutch system according to claim 5, wherein
   the supply control part modifies the second current value by a correction amount smaller than the modification amount when the modification amount for the second current value according to the rotational speed difference is equal to or greater than a predetermined current value.

7. The clutch system according to claim 4, wherein the supply control part i) decreases the second current value for the next transition of the clutch from the disengaged state to the engaged state, when the time point at which the rotational speed difference equal to or greater than the predetermined threshold value is detected is earlier than the timing, and ii) increases the second current value for the next transition of the clutch from the disengaged state to the engaged state, when the time point at which the rotational speed difference equal to or greater than the predetermined threshold value is detected is later than the timing.

8. The clutch system according to claim 4, wherein the supply control part modifies the second current value when the number of times the rotational speed difference equal to or greater than the predetermined threshold value is detected is equal to or greater than a predetermined number of times for determining whether to modify the second current value.

9. The clutch system according to claim 8, wherein the supply control part i) decreases the second current value when a first count, obtained when the rotational speed difference equal to or greater than the predetermined threshold value is detected before the timing, reaches or exceeds the predetermined number of times, and ii) increases the second current value when a second count, obtained when the rotational speed difference equal to or greater than the predetermined threshold value is detected after the timing, reaches or exceeds the predetermined number of times.

10. The clutch system according to claim 9, wherein the supply control part i) resets the first count to zero and sets the second count to one if the rotational speed difference equal to or greater than the predetermined threshold value is detected after the timing and before the first count reaches or exceeds the predetermined number of times, and ii) resets the second count to zero and sets the first count to one if the rotational speed difference equal to or greater than the predetermined threshold value is detected before the timing and before the second count reaches or exceeds the predetermined number of times.

* * * * *